US009923784B2

(12) United States Patent
Chitti et al.

(10) Patent No.: US 9,923,784 B2
(45) Date of Patent: Mar. 20, 2018

(54) DATA TRANSFER USING FLEXIBLE DYNAMIC ELASTIC NETWORK SERVICE PROVIDER RELATIONSHIPS

(71) Applicant: INTERNATIONAL BUSINESS MACHINES CORPORATION, Armonk, NY (US)

(72) Inventors: Mark V. Chitti, Lexington, KY (US); Douglas M. Freimuth, New York, NY (US); John F. Hollingsworth, Wynnewood, PA (US); Baiju D. Mandalia, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 61 days.

(21) Appl. No.: 14/952,456

(22) Filed: Nov. 25, 2015

(65) Prior Publication Data

US 2017/0149625 A1 May 25, 2017

(51) Int. Cl.
*H04L 12/24* (2006.01)
*H04L 12/911* (2013.01)
(Continued)

(52) U.S. Cl.
CPC ...... *H04L 41/5003* (2013.01); *H04L 41/0896* (2013.01); *H04L 47/70* (2013.01);
(Continued)

(58) Field of Classification Search
CPC . H04L 1/5003; H04L 1/5006; H04L 12/1403; H04L 12/141
See application file for complete search history.

(56) References Cited

U.S. PATENT DOCUMENTS 4,144,414 A 3/1979 Nicholas
6,205,477 B1 * 3/2001 Johnson ............ H04L 29/12066
709/203

(Continued)

FOREIGN PATENT DOCUMENTS

WO 2014021839 A1 2/2014

OTHER PUBLICATIONS

Hwang et al., "Design and Implementation of an iLVM Mechanism for Remote Mirror", Kuasir College of Electrical Engineering and Computer Science, Department of Electrical Engineering, Journal of Internet Technology, 7(2), Apr. 2006, pp. 169-176.

(Continued)

*Primary Examiner* — Warner Wong
(74) *Attorney, Agent, or Firm* — William Hartwell; Matthew M. Hulihan; Heslin Rothenberg Farley & Mesiti PC

(57) ABSTRACT

Data transfer using flexible dynamic elastic network service provider relationships is provided. A relationship is dynamically established with an elastic network service provider of multiple available elastic network service providers to transfer a portion of the set of data to the target. Peering policies for each of the multiple elastic network service providers are checked, where a respective peering policy for each elastic network service provider includes respective bandwidth pricing information. Based on the bandwidth pricing information for each of the plurality of elastic network service providers, an elastic network service provider and a schedule are selected to use in transferring the portion to the target. The elastic network service provider is used in transferring the portion to the target, which includes dynamically configuring elastic network bandwidth allocation from the elastic network service provider and initiating transfer of the portion to the target according to the selected schedule.

21 Claims, 5 Drawing Sheets

(51) Int. Cl.
*H04L 29/08* (2006.01)
*H04L 12/14* (2006.01)
(52) U.S. Cl.
CPC ............ *H04L 67/10* (2013.01); *H04L 12/141* (2013.01); *H04L 12/1403* (2013.01)

(56) References Cited

U.S. PATENT DOCUMENTS

| | | | |
|---|---|---|---|
| 6,389,432 B1 | 5/2002 | Srinivas et al. | |
| 6,418,139 B1 | 7/2002 | Akhtar | |
| 6,563,829 B1 | 5/2003 | Lyles et al. | |
| 6,937,566 B1 | 8/2005 | Forslow | |
| 7,089,294 B1 | 8/2006 | Baskey et al. | |
| 7,103,906 B1 | 9/2006 | Katz | |
| 7,542,420 B1 | 6/2009 | Mokhtar et al. | |
| 7,590,746 B2 | 9/2009 | Slater | |
| 7,685,310 B2 | 3/2010 | Ueoka et al. | |
| 7,808,918 B2 | 10/2010 | Bugenhagen | |
| 7,844,967 B2 | 11/2010 | Kelly | |
| 8,412,824 B1 | 4/2013 | Schiff | |
| 8,464,335 B1 | 6/2013 | Sinha et al. | |
| 8,660,008 B2 | 2/2014 | Babiarz et al. | |
| 8,762,505 B2 | 6/2014 | Kutan et al. | |
| 8,788,690 B2 | 7/2014 | Short et al. | |
| 8,793,343 B1 | 7/2014 | Sorenson, III et al. | |
| 8,799,320 B2 | 8/2014 | Chan et al. | |
| 8,873,753 B2 | 10/2014 | Parker | |
| 9,026,671 B2 | 5/2015 | Gillies et al. | |
| 9,172,771 B1 | 10/2015 | Gross et al. | |
| 9,207,993 B2 | 12/2015 | Jain | |
| 9,330,156 B2 | 5/2016 | Satapathy | |
| 9,495,251 B2 | 11/2016 | Kottomtharayil | |
| 9,535,776 B2 | 1/2017 | Klose | |
| 9,596,144 B2 | 3/2017 | Anderson | |
| 2002/0049841 A1 | 4/2002 | Johnson | |
| 2002/0101869 A1 | 8/2002 | Garcia-Luna-Aceves et al. | |
| 2002/0112113 A1 | 8/2002 | Karpoff et al. | |
| 2002/0124262 A1 | 9/2002 | Basso et al. | |
| 2002/0133613 A1 | 9/2002 | Teng et al. | |
| 2002/0144174 A1 | 10/2002 | Nwabueze | |
| 2002/0181394 A1 | 12/2002 | Partain et al. | |
| 2002/0194324 A1 | 12/2002 | Guha | |
| 2003/0021338 A1 | 1/2003 | Mazzoni | |
| 2003/0037061 A1 | 2/2003 | Sastri et al. | |
| 2003/0069963 A1 | 4/2003 | Jayant et al. | |
| 2003/0110263 A1 | 6/2003 | Shillo | |
| 2003/0120666 A1* | 6/2003 | Tacaille ................ H04L 41/145 |
| 2003/0126132 A1 | 7/2003 | Kavuri et al. | |
| 2003/0172130 A1 | 9/2003 | Fruchtman et al. | |
| 2003/0202477 A1 | 10/2003 | Zhen et al. | |
| 2004/0098671 A1* | 5/2004 | Graham ............ G06F 17/30017 715/274 |
| 2004/0198360 A1* | 10/2004 | Kotzin ................ H04W 48/18 455/445 |
| 2004/0199566 A1 | 10/2004 | Carlson et al. | |
| 2004/0215644 A1 | 10/2004 | Edwards, Jr. et al. | |
| 2004/0215749 A1 | 10/2004 | Tsao | |
| 2004/0246972 A1 | 12/2004 | Wang et al. | |
| 2005/0033935 A1 | 2/2005 | Manbert et al. | |
| 2005/0125593 A1 | 6/2005 | Karpoff et al. | |
| 2005/0129000 A1 | 6/2005 | Sivakumar et al. | |
| 2005/0154841 A1 | 7/2005 | Sastri et al. | |
| 2005/0273451 A1 | 12/2005 | Clark et al. | |
| 2005/0289618 A1 | 12/2005 | Hardin | |
| 2006/0129562 A1 | 6/2006 | Pulamarasetti et al. | |
| 2006/0171390 A1 | 8/2006 | LaJoie | |
| 2006/0206682 A1 | 9/2006 | Manbert et al. | |
| 2006/0218369 A1 | 9/2006 | Fujino | |
| 2006/0248231 A1 | 11/2006 | O'Rourke et al. | |
| 2006/0265558 A1 | 11/2006 | Fujino | |
| 2007/0022264 A1 | 1/2007 | Bromling et al. | |
| 2007/0065078 A1 | 3/2007 | Jiang | |
| 2007/0106798 A1 | 5/2007 | Masumitsu | |
| 2007/0195765 A1* | 8/2007 | Heissenbuttel ..... H04L 12/4641 370/389 |
| 2007/0198627 A1 | 8/2007 | Bozionek et al. | |
| 2008/0109450 A1 | 5/2008 | Clark et al. | |
| 2008/0115144 A1 | 5/2008 | Tsao | |
| 2008/0140850 A1* | 6/2008 | Gade ................ H04M 15/8044 709/231 |
| 2008/0259798 A1 | 10/2008 | Loh | |
| 2008/0320097 A1 | 12/2008 | Sawicki et al. | |
| 2009/0007199 A1 | 1/2009 | JaJoie | |
| 2009/0061853 A1* | 3/2009 | Anschutz ............ H04L 12/5692 455/432.1 |
| 2009/0100163 A1 | 4/2009 | Tsao | |
| 2009/0172782 A1 | 7/2009 | Taglienti et al. | |
| 2009/0187668 A1* | 7/2009 | Arendt ................ G06F 11/2023 709/230 |
| 2009/0204711 A1 | 8/2009 | Binyamin | |
| 2009/0217326 A1 | 8/2009 | Hasek | |
| 2009/0240867 A1 | 9/2009 | Shibayama et al. | |
| 2009/0271589 A1 | 10/2009 | Karpoff et al. | |
| 2010/0257602 A1 | 10/2010 | Kettler et al. | |
| 2010/0268632 A1 | 10/2010 | Rosenthal | |
| 2010/0274656 A1 | 10/2010 | Genschel | |
| 2010/0306382 A1 | 12/2010 | Cardosa | |
| 2010/0306445 A1 | 12/2010 | Dake | |
| 2010/0332401 A1 | 12/2010 | Prahlad et al. | |
| 2011/0004550 A1 | 1/2011 | Giordano et al. | |
| 2011/0022697 A1* | 1/2011 | Huh ........ G06F 9/505 709/224 |
| 2011/0078227 A1 | 3/2011 | McAloon et al. | |
| 2011/0083037 A1 | 4/2011 | Bocharov et al. | |
| 2011/0125889 A1 | 5/2011 | Tsao | |
| 2011/0158653 A1 | 6/2011 | Mazed | |
| 2011/0208710 A1 | 8/2011 | Lesavich | |
| 2011/0218770 A1 | 9/2011 | Ii | |
| 2011/0282928 A1* | 11/2011 | Ball ........ G06Q 30/06 709/202 |
| 2011/0293278 A1 | 12/2011 | Mazed | |
| 2012/0023545 A1 | 1/2012 | Qu | |
| 2012/0063353 A1 | 3/2012 | Schlenk | |
| 2012/0072600 A1* | 3/2012 | Richardson ......... H04L 67/1097 709/226 |
| 2012/0109705 A1* | 5/2012 | Belady ............ G06Q 10/06312 705/7.22 |
| 2012/0131309 A1 | 5/2012 | Johnson | |
| 2012/0137173 A1 | 5/2012 | Burshan et al. | |
| 2012/0180080 A1 | 7/2012 | Lajoie | |
| 2012/0201130 A1 | 8/2012 | Liv et al. | |
| 2012/0210381 A1 | 8/2012 | Ozawa | |
| 2012/0216259 A1* | 8/2012 | Okamoto ............ H04L 12/4641 726/4 |
| 2012/0331221 A1 | 12/2012 | Cho | |
| 2013/0003538 A1 | 1/2013 | Greenberg et al. | |
| 2013/0007254 A1 | 1/2013 | Fries | |
| 2013/0031258 A1* | 1/2013 | Mukai ................ H04L 12/6418 709/227 |
| 2013/0081014 A1 | 3/2013 | Kadatch | |
| 2013/0185404 A1 | 7/2013 | Patel et al. | |
| 2013/0204963 A1 | 8/2013 | Boss et al. | |
| 2013/0205002 A1 | 8/2013 | Wang et al. | |
| 2013/0212282 A1 | 8/2013 | Pulier | |
| 2013/0212422 A1 | 8/2013 | Bauer et al. | |
| 2013/0227009 A1 | 8/2013 | Padmanaban et al. | |
| 2013/0242903 A1 | 9/2013 | Narkar | |
| 2013/0254383 A1 | 9/2013 | Wray | |
| 2013/0254407 A1 | 9/2013 | Pijewski | |
| 2013/0268672 A1 | 10/2013 | Justafort | |
| 2013/0282795 A1 | 10/2013 | Tsao | |
| 2014/0040343 A1 | 2/2014 | Nickolov et al. | |
| 2014/0057592 A1 | 2/2014 | Chetlur | |
| 2014/0068076 A1 | 3/2014 | Dasher et al. | |
| 2014/0075029 A1 | 3/2014 | Lipchuk | |
| 2014/0082301 A1 | 3/2014 | Barton et al. | |
| 2014/0082681 A1 | 3/2014 | Brown et al. | |
| 2014/0115189 A1 | 4/2014 | Ao et al. | |
| 2014/0129819 A1 | 5/2014 | Huang et al. | |
| 2014/0180664 A1 | 6/2014 | Kochunni et al. | |
| 2014/0188801 A1 | 7/2014 | Ramakrishnan et al. | |
| 2014/0207968 A1 | 7/2014 | Kumar et al. | |
| 2014/0233587 A1 | 8/2014 | Liv et al. | |

(56) References Cited

U.S. PATENT DOCUMENTS

| | | | |
|---|---|---|---|
| 2014/0244835 A1 | 8/2014 | Lopez | |
| 2014/0258535 A1 | 9/2014 | Zhang | |
| 2014/0281015 A1 | 9/2014 | Orona et al. | |
| 2014/0289205 A1 | 9/2014 | Soichi | |
| 2014/0344879 A1 | 11/2014 | Phillips et al. | |
| 2014/0365658 A1* | 12/2014 | Lang | H04L 67/34 709/226 |
| 2015/0006614 A1 | 1/2015 | Suryanarayanan | |
| 2015/0019740 A1 | 1/2015 | Zhao | |
| 2015/0026793 A1 | 1/2015 | Li | |
| 2015/0046960 A1 | 2/2015 | Hardin | |
| 2015/0067093 A1 | 3/2015 | Sawicki et al. | |
| 2015/0067744 A1 | 3/2015 | Furtwangler | |
| 2015/0082362 A1 | 3/2015 | Hasek | |
| 2015/0117198 A1 | 4/2015 | Menezes et al. | |
| 2015/0134731 A1 | 5/2015 | Wang et al. | |
| 2015/0134830 A1 | 5/2015 | Popa | |
| 2015/0156204 A1 | 6/2015 | Resch | |
| 2015/0172070 A1 | 6/2015 | Csaszar | |
| 2015/0195173 A1* | 7/2015 | Gupta | H04L 67/1002 709/224 |
| 2015/0222445 A1 | 8/2015 | Iyer et al. | |
| 2015/0234636 A1 | 8/2015 | Barnes, Jr. | |
| 2015/0235308 A1 | 8/2015 | Mick et al. | |
| 2015/0288919 A1 | 10/2015 | Labosco | |
| 2016/0066261 A1* | 3/2016 | Nasielski | H04W 48/18 455/406 |
| 2016/0197835 A1 | 7/2016 | Luft | |
| 2016/0197848 A1 | 7/2016 | Bhide | |
| 2016/0231948 A1 | 8/2016 | Gupta et al. | |
| 2017/0076057 A1 | 3/2017 | Burton | |
| 2017/0090773 A1 | 3/2017 | Vijayan | |

OTHER PUBLICATIONS

XRoads Networks, "Dynamic Bandwidth Management", retrieved from internet Nov. 11, 2014, http://dualwanfirewalls.com/ubm/solutions/dynamic_bandwidth_control.xrn, pp. 1-4.

IBM, Internal Model for Dynamically-Virtualizing the Storage of Data Between a RAID-6 and a Mirror, IP.com, No. 000160533, Nov. 19, 2007, pp. 1-5.

Weil, Reliable, Scalable, and High-Performance Distributed Storage: Distributed Object Storage, IP.com, No. 000234957, Feb. 19, 2014, pp. 1-11.

List of IBM Patents or Patent Applications Treated as Related, Dec. 1, 2015, pp. 1-2.

Office Action in U.S. Appl. No. 14/731,834, dated Apr. 19, 2017, pp. 1-22.

Office Action in U.S. Appl. No. 14/952,466, dated Jun. 26, 2017, pp. 1-35.

Office Action in U.S. Appl. No. 14/952,463, dated May 22, 2017, pp. 1-27.

Office Action in U.S. Appl. No. 14/952,449, dated Jul. 25, 2017, pp. 1-41.

Office Action in U.S. Appl. No. 14/952,437, dated Sep. 18, 2017, pp. 1-36.

Office Action in U.S. Appl. No. 14/952,469, dated Oct. 3, 2017, pp. 1-51.

Elali, H. (Elali, Hala, SAN Zone Reuse in Port Allocation, https://coprhd.atlassian.net/wiki/spaces/COP/pages/861800/SAN+Zone+Reuse+in+Port+Allocation, Oct. 15, 2015.

* cited by examiner

DATA TRANSFER USING FLEXIBLE DYNAMIC ELASTIC NETWORK SERVICE PROVIDER RELATIONSHIPS

BACKGROUND

Aspects described herein relate to configuration of network features, and more particularly to configuring elastic network features for transfer of data. Bandwidth is conventionally provisioned to meet a projected peak data demand and paid for over the course of a contract that may stretch for several years. Peak demand may occur relatively infrequently, resulting in over-provisioning for a significant amount of time. This over-provisioning of the bandwidth results in excess costs to a customer who is paying for unused bandwidth over the course of the contract.

An attempt to lower costs by provisioning less bandwidth over the course of the contract is largely ineffective because of expensive overcharges when peak demand exceeds the amount of bandwidth provisioned. Bandwidth considerations and costs are especially important in large data center applications, such as data mirroring or backup, where the amount of data being transferred, and therefore the resulting bandwidth consumption, is potentially massive.

SUMMARY

Shortcomings of the prior art are overcome and additional advantages are provided through the provision of a computer-implemented method that includes based on a determination to transfer a set of data from a source storage location to a target storage location, dynamically establishing a relationship with an elastic network service provider of a plurality of available elastic network service providers to transfer a portion of the set of data to the target storage location, the dynamically establishing comprising: checking a respective peering policy for each elastic network service provider of the plurality of elastic network service providers, the peering policy for each elastic network service provider comprising respective bandwidth pricing information; selecting, based on the bandwidth pricing information for each of the plurality of elastic network service providers, an elastic network service provider to use in transferring the portion of the set of data to the target storage location and a schedule for transferring the portion of the set of data; and using the elastic network service provider in transferring the portion of the set of data to the target storage location, the using comprising dynamically configuring elastic network bandwidth allocation from the elastic network service provider and initiating transfer of the portion of the set of data to the target storage location according to the selected schedule.

Further, a computer program product including a computer readable storage medium readable by a processor and storing instructions for execution by the processor is provided for performing a method that includes: based on a determination to transfer a set of data from a source storage location to a target storage location, dynamically establishing a relationship with an elastic network service provider of a plurality of available elastic network service providers to transfer a portion of the set of data to the target storage location, the dynamically establishing comprising: checking a respective peering policy for each elastic network service provider of the plurality of elastic network service providers, the peering policy for each elastic network service provider comprising respective bandwidth pricing information; selecting, based on the bandwidth pricing information for each of the plurality of elastic network service providers, an elastic network service provider to use in transferring the portion of the set of data to the target storage location and a schedule for transferring the portion of the set of data; and using the elastic network service provider in transferring the portion of the set of data to the target storage location, the using comprising dynamically configuring elastic network bandwidth allocation from the elastic network service provider and initiating transfer of the portion of the set of data to the target storage location according to the selected schedule.

Yet further, a computer system is provided that includes a memory and a processor in communications with the memory, wherein the computer system is configured to perform a method including: based on a determination to transfer a set of data from a source storage location to a target storage location, dynamically establishing a relationship with an elastic network service provider of a plurality of available elastic network service providers to transfer a portion of the set of data to the target storage location, the dynamically establishing comprising: checking a respective peering policy for each elastic network service provider of the plurality of elastic network service providers, the peering policy for each elastic network service provider comprising respective bandwidth pricing information; selecting, based on the bandwidth pricing information for each of the plurality of elastic network service providers, an elastic network service provider to use in transferring the portion of the set of data to the target storage location and a schedule for transferring the portion of the set of data; and using the elastic network service provider in transferring the portion of the set of data to the target storage location, the using comprising dynamically configuring elastic network bandwidth allocation from the elastic network service provider and initiating transfer of the portion of the set of data to the target storage location according to the selected schedule.

Aspects of the above have an advantage of providing the ability for customers to dynamically determine which network(s) offers a desired mix of cost, capacity, and timing to effect data transfers, providing opportunity for flexibility and optimization in dynamically setting a relationship with a provider and allocating only the bandwidth needed and for the time needed. By selecting the best network service provider to use and allocating bandwidth for only a needed or desired bandwidth level and timeframe, the transfer is optimized. Thus, advantages are provided not only in enabling dynamic adjustment to elastic bandwidth, but also in establishing a dynamic relationship with an elastic network provider to effect the desired transfer with reduced or minimal costs. A dynamic, on-demand relationship may be established for bandwidth allocation, and the relationship can terminate or pause at the conclusion of a transfer, advantageously reducing or minimizing costs because no static ongoing relationship is needed. This also has an advantage for the network service providers because it establishes a market for network service providers to sell excess bandwidth that might otherwise go unused.

Selecting the elastic network service provider and the schedule may be based on considering cost to transfer the portion of the set of data, taken across a plurality of different bandwidth levels at a plurality of different times of day, which has an advantage of helping to identify a most cost effective option within time and other constraints.

The set of data can include multiple portions, where the transfer of the portion of the set of data is part of a staged transfer of the multiple portions of the set of data to the target storage location. The method can further include repeating, for each additional portion of the multiple portions of the set of data, the dynamically establishing a relationship with an elastic network service provider of a plurality of available elastic network service providers to transfer the additional portion of the set of data.

For each portion of the multiple portions, the selection of the elastic network service provider to use can be made independent of the selection of the elastic network service provider to use for the other portions of the multiple portions. Thus, a different dynamic relationship may be established with a first elastic network service provider for transferring the portion of data than a dynamic relationship established with a second elastic network service provider for transferring an additional portion of the set of data, the first elastic network service provider being different than the second elastic network service provider. Additionally, the selected schedule to transfer the portion of the set of data may be different from the selected schedule to transfer another portion of the set of data. The above have advantages in the flexibility provided. The transfer of the set of data is not locked into any particular parameters (provider, bandwidth allocation level, timing, etc.) across portions of the data. Each portion can be transferred according to parameters that are most appropriate for that portion given the timing, bandwidth needed, type of data, etc. This enables costs and other parameters to be optimized.

The checking can include accessing, for each elastic network service provider of the plurality of elastic network service providers, a respective interface exposed by the elastic network service provider to obtain the bandwidth pricing information. This has an advantage in that it avoids transfer and entrance of policy information manually, while enabling a site to easily, on-demand, and quickly extract pricing and other information from the providers to facilitate establishing dynamic and on-demand relationships with the providers.

Another aspect includes, based on completion of the transfer of the portion of the set of data, deallocating bandwidth from the elastic network service provider to minimize transfer cost. Strategically selecting a provider and schedule, allocating only the necessary bandwidth at the necessary time (according to the schedule), and deallocating the bandwidth when finished has an advantage that the transfer cost can be minimized.

Yet another aspect includes initially determining that the transfer is to be performed, the determining being based on one or more of volume or rate of change of the set of data. This has an advantage of recognizing whether/when traditional physical shipment of the data may not be not practical.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects described herein leverage elastic network technologies that provide for dynamic provisioning of wide area network bandwidth and transfer capability between sites. More particularly, staged transfer of data between locations is provided. Based on checking and considering terms offered by multiple potential elastic network service providers to effect transfer of a portion of the data, an elastic network service provider of the multiple providers is selected and a relationship with that provider is dynamically established to effect the transfer of the portion of data. This involves dynamically configuring a selected amount of bandwidth to complete the transfer and deallocating the bandwidth when the transfer is completed. This can repeat for multiple portions of the data to be transferred, in which potentially many different network service providers are used depending on factors like bandwidth pricing and capacity offered by each of the network service providers. This has an advantage of providing the ability for customers to dynamically determine which network(s) offers a desired mix of cost, capacity, and timing to effect data transfers, providing opportunity for flexibility and optimization in dynamically setting a relationship with a provider, allocating only the bandwidth needed and for the time needed, the releasing the bandwidth (thereby reducing costs). This is advantageous over conventional approaches operating under a fixed relationship with a largely static bandwidth allocation.

Figure 1:
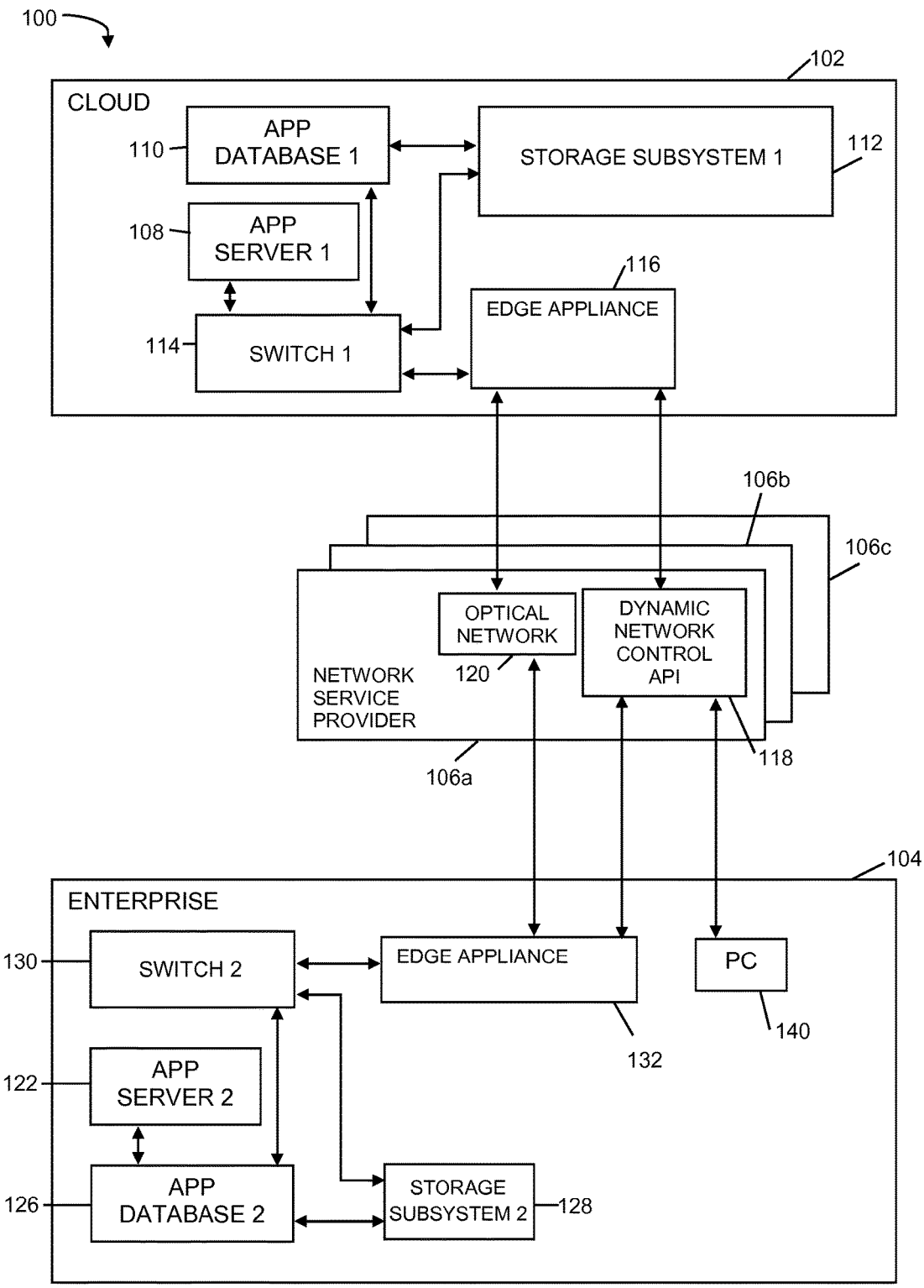
FIG. 1 depicts an example computing environment having elastic network capabilities, to incorporate and use aspects described herein.

FIG. 1 depicts an example computing environment having elastic network capabilities, to incorporate and use aspects described herein. In some examples, dedicated channel(s) across a network are utilized for data transfer from a first storage resource/location to a second storage resource/location. Environment 100 provides, as an example, data transfer between a first site 102 and a second site 104 using at least one network service provider (such as 106a) providing an elastic cloud computing network. In one embodiment, network service provider 106a provides a programmable WAN that is used for the data transfer.

First site 102 includes a first application server 108 (i.e. a computer) hosting one or more applications, a first application database 110, a first storage subsystem 112 (i.e., a first storage resource), for instance a storage area network (SAN) volume controller (SVC), a first switch 114 (such as a SAN switch) and a first edge appliance 116, which may be a router or other edge device, for example. In one embodiment, application server 108 or storage subsystem 112 runs a data replication application that replicates data in first application database 110 from first storage subsystem 112 via first switch 114 and first edge appliance 116.

Management of elastic network bandwidth allocation is provided in the environment. A feature of the environment 100 is that one or more processes can determine and inform a dynamic network control application programming interface (API) 118 of the network service provider about when and how much bandwidth of an elastic cloud computing network 120 should be allocated for transfer of data, which transfer may utilize a dedicated channel to the second site 104 via a network 120. In this example, network 120 is an optical network provided by network service provider 106a. In one embodiment, optical network 120 is used as a WAN. In another embodiment, optical network 120 is a Multiprotocol Label Switching (MPLS) network and application server 108 utilizes a Fiber Channel over Ethernet EDU01 network interface to connect first switch 114 and first edge appliance 116 to the MPLS network.

Dynamic network control API 118 is executed, in one example, by a transport device (not shown), that is managed by network service provider 106a. Dynamic network control API 118 allows first storage subsystem 112, second storage subsystem 128, an edge appliance (116, 132), a PC 140, or any other component at site 102, 104, or another site to dynamically change bandwidth allocation from network service provider 106a. This is leveraged in accordance with aspects described herein to optimize bandwidth allocation and usage and therefore decrease the cost associated with transferring data using that bandwidth.

Second site 104 can include components similar to those of first site 102. Thus, in this example, second site similarly includes a second application server 122 (i.e., a computer), second application database 126, second storage subsystem 128 (i.e., a second storage resource), second switch 130, and a second edge appliance 132. In one embodiment, data is transferred from first site 102 to second site 104, i.e. from first storage subsystem 112 via first switch 114 and first edge appliance 116 over optical network 120 to second storage subsystem 128 via second edge appliance 132 and second switch 130. Data may be transferred similarly from second site 104 to first site 102.

An example data transfer from one site to another site occurs during backup, disaster recovery, or cloud onboarding processes. In the example of FIG. 1, the second site 104 is an enterprise site that is the source storage location of data to transfer, and the first site 102 is a cloud site that is the target storage location.

It is not uncommon today to require that many terabytes of data be transferred to a different location for backup, onboarding, analysis, or other reasons. However, big data applications and other large datasets are trapped by WAN capacity cost constraints. The cost of moving databases increases as the change rate goes up due to the increase in needed capacity. Acquiring sufficient capacity generally requires a relatively long-term commitment (multiple years) and can take months to provision. As a dataset grows in size, the cost to move it increases, thus trapping the data where it resides. Meanwhile, significant amounts of bandwidth in static bandwidth arrangements tend to go underutilized, as described above. Elastic network capability introduces logic to exploit elastic capacity dynamically, on-demand to provide much less expensive network services. Aspects described herein have an advantage of not only enabling dynamic adjustment to elastic bandwidth, but also establishing dynamic relationships with potentially many different elastic network providers to effect the desired transfer with reduced or minimal costs.

'Big data' refers to a set of data that changes faster than the owning entity can practically afford to move it (unpredictable change rates). Features described herein facilitate transfer of this kind of data in efficient ways to reduce or minimize transfer costs, providing:

Movement of larger, faster changing data sets at an affordable cost, with the advent of dynamic high capacity (1-10 Gbps) connectivity;

Predictive advance multicast of data to large storage pools at sites (such as carrier points-of-presence (POPs), which typically provide concentration of circuit drop points at important co-location facilities with partners. These circuits include fiber and sonet ring technologies, as examples;

Massive scaling for staged transfers based on properties such as application type and time of day Peering agreements with multiple providers, and dynamic policies for network-to-network interfacing (NNI) and flexible and dynamic choice of a service provider to use based on context.

Unicast to several locations: perhaps randomly distributed across end points, and depending on window size to certain locations. Unicast refers to simultaneous transfer of the same data to different locations. The window refers to a time interval associated with availability of the elastic bandwidth or time-frame to make data available at another location.

An approach described herein lowers the costs of moving big data and applications from one data center to another, whether into a cloud site, between two legacy sites, or the like. This is done by leveraging (i) elastic capacity (bandwidth capacity is acquired, tailored dynamically, and paid-for based on use instead of according to a static long-term commitment), and (ii) the availability of peering information including price, bandwidth capacity, and other information from multiple different elastic network providers to select a desired provider to effect a particular transfer. A set of data—perhaps a very large set—to be transferred from one site to another progresses in portions where, for any given portion to be transferred, a consideration of which provider of several different network service providers can be made to determine which of the providers to use as desired. In a staged transfer that might span multiple days or longer and take place across several non-contiguous timeframes, different providers may be dynamically selected depending on the bandwidth pricing and capacity being offered by the providers at any given time. In addition, multiple different providers can be utilized contemporaneously to transfer respective different portions of the larger set. The multiple different providers may be selected according to the properties of the respective potion(s) they each transfer. One provider may be better suited to transfer a larger portion of data at a slower rate than another provider, which may be selected to transfer a smaller portion of data at a much higher rate, for example.

Advantageously, elastic bandwidth allocation is controlled to optimize bandwidth utilization. In addition, selectivity is provided in the particular elastic network provider to use based on the needs and costs involved. This is in contrast to a typical situation where a site is under a multi-year contract for a static amount of bandwidth. Instead, as described herein, sites need not be tied to a given provider, and different capacity may be allocated at different times from different providers to move the data or portions thereof. This provides a potentially limited duration of engagement between a site and a given network provider, allowing one-off relationships in which the customer pays only for that the duration of the move event.

Pricing information can be obtained from the different network providers by any of various methods. In one example, the pricing information from a network service provider is obtained via an API, for instance one that is part of the provider's dynamic bandwidth API. The provider can expose the API to potential customers to enable rapid queries for pricing, bandwidth level, and other information delineating the relationship of the engagement between the provider and the customer. This peering policy may be customer-specific, setting particular terms for particular customers and/or providing specialized pricing depending on the customer (volume discounts for instance).

Thus, the service providers can have associated peering policies offering bandwidth capacity at various prices depending on the time, amount of bandwidth, and other parameters. Customers can utilize an API that enables them to establish a dynamic, on-demand relationship for bandwidth allocation. The relationship can terminate or pause at the conclusion of a transfer, advantageously reducing or minimizing costs because no static, ongoing relationship is needed. This is also advantageous for the network service providers because it establishes a market for network service providers to sell excess bandwidth that might otherwise go unused.

The above can be leveraged to unicast or multicast data over the elastic network to PoPs and/or other sites having sufficient storage capacity. In some examples, different types of data are sent to different sites depending on location needs and utilizing potentially different network service providers. A storage mesh network can also be implemented to store and relay information based on bandwidth availability. A storage mesh allows indirect access of the content from any one of the locations in the mesh arrangement allowing access to needed data from a destination to be accessed and transferred into that location.

Referring to FIG. 1, multiple network service providers 106a, 106b, . . . , 106n are available for use in transferring data between sites 102 and 104. Dynamic bandwidth control functionality of an edge appliance (116, 132), PC 140, and/or any other component desired can configure elastic network bandwidth allocation via each network service provider's respective API 118. Accordingly, edge appliance (s) and/or PCs disposed at any site may be in communication directly or through another component with each of the APIs provided by the elastic network service providers.

Figure 2:
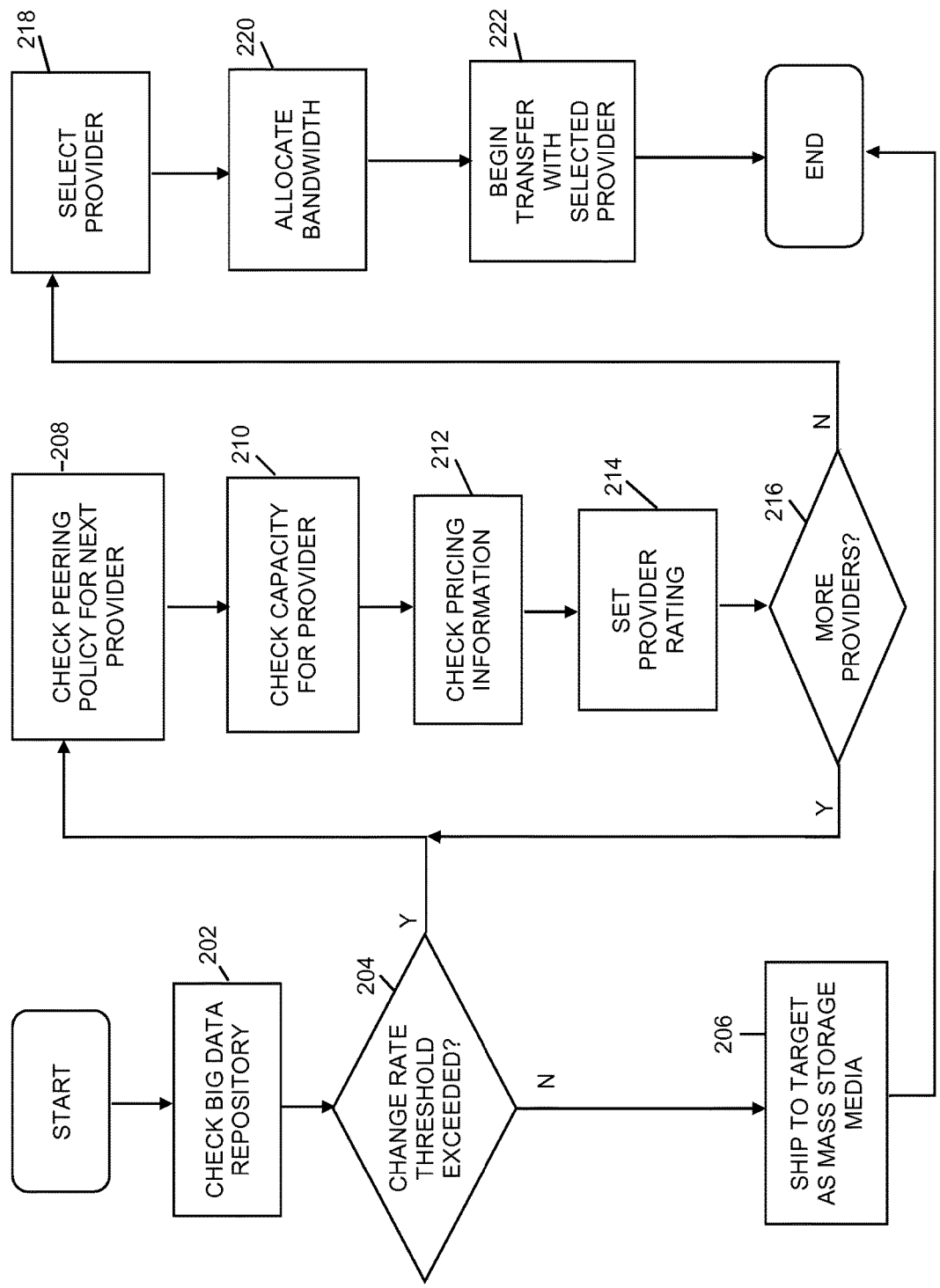
FIG. 2 depicts an example process for transferring data from a source storage location to a target storage location in accordance with aspects described herein.

One or more processes running on such a bandwidth control component or another component/server can make determinations and selections about which portions to transfer, which provider(s) to use, and at which times, given the peering policies offered by the network service providers 106a, . . . , 106n. This can be done as part of a staged transfer of a set of data having multiple portions. FIG. 2 depicts an example process for transferring data from a source storage location to a target storage location in accordance with aspects described herein. In this example, the process is performed by an edge appliance, such as a bandwidth control component thereof. The process begins with the edge appliance initially checking/monitoring the data repository (202) to determine whether a data change rate threshold is exceeded (204). The threshold is a minimum rate of change at which the transfer is determined to be performed digitally instead of via traditional mailing of mass storage media. If the data is changing relatively slowly, than it may be acceptable to mail the backup and patch any changes at the destination after the backup is restored. Thus, if the change rate threshold is not exceeded, then the process ships the data to the target storage location as mass storage media (206) and the process ends.

Otherwise, a move event is triggered for the repository that is (relatively) fast changing. A loop is entered at this point and performed for each network service provider of multiple network service providers. The loop begins with the edge appliance checking the peering policy (208) for the provider, which can include information about bandwidth pricing and availability, as well as other terms of the engagement, and checks the available/excess capacity for that provider (210). The edge appliance checks the bandwidth pricing information (212) and sets a provider rating (214) that rates the provider. The rating may be based on any desired parameters, such as total cost (based on the bandwidth pricing information) to transfer one or more portion (s), quality, timing/schedule, etc. A provider that offers the needed bandwidth at a relatively high price even at an off-peak time might receive a significantly lower rating than a provider that offers the needed bandwidth for a lower price during a peak time (and an even lower price during the off-peak time). The edge appliance then determines whether there are more providers to query (216), and if so the process returns to (208) to iterate the loop. In this manner, the process loops to query each available network service provider that provides capacity in order to understand how to best exploit the bandwidth availability. The edge appliance selects a provider from the multiple queried providers (218) based on its rating for performing the transfer. It is noted that a schedule for the transfer can also be established, since the transfer may not necessarily need to begin immediately. The process might, for instance, determine to provision bandwidth during the next off-peak period, for example, and select the least expensive option of all of the network service providers for accomplishing that transfer.

The process proceeds after selecting a provider with the edge appliance allocating the bandwidth (220) and beginning the transfer using the selected provider (222).

The set of data being transferred might be broken into multiple portions. The process of FIG. 2 might be used to determine, for each such portion, a network service provider to use and a schedule for transferring that portion. This may be done on a one-time basis or a continuing basis. For instance, the process of FIG. 2 or portions thereof might repeat aperiodically or periodically, for instance every day or every timeframe in which at least some of the data is to be transferred. This processing performs selections of the service provider(s) to use, which selections may be independent of each other, meaning potentially different providers are used to transfer different portions depending on which offer the best terms at the time. Additionally, the process may proceed for each separate portion to be transferred even if the portion might be transferred at a same time as another portion, since the provider chosen to transfer a given portion might depend on the properties (size, priority, etc.) of the data portion itself. It may be decided that two different portions are to be transferred contemporaneously using two different providers.

In some examples, the dynamic, on-demand relationship established with a provider includes (i) establishing an initial relationship/account with the provider (if not already existent), (ii) allocating/provisioning bandwidth for the duration of the move, then (iii) deallocating/deprovisioning bandwidth at the conclusion of the move. Advantageously, by selecting the best network service provider to use and allocating bandwidth for only a needed or desired bandwidth level and timeframe, the transfer is optimized. As noted, the move might be completed in stages, with portions of data of the entire set being transferred at different times and using potentially different providers, where a transfer relationship is dynamically established on-demand with each provider.

Figure 3:
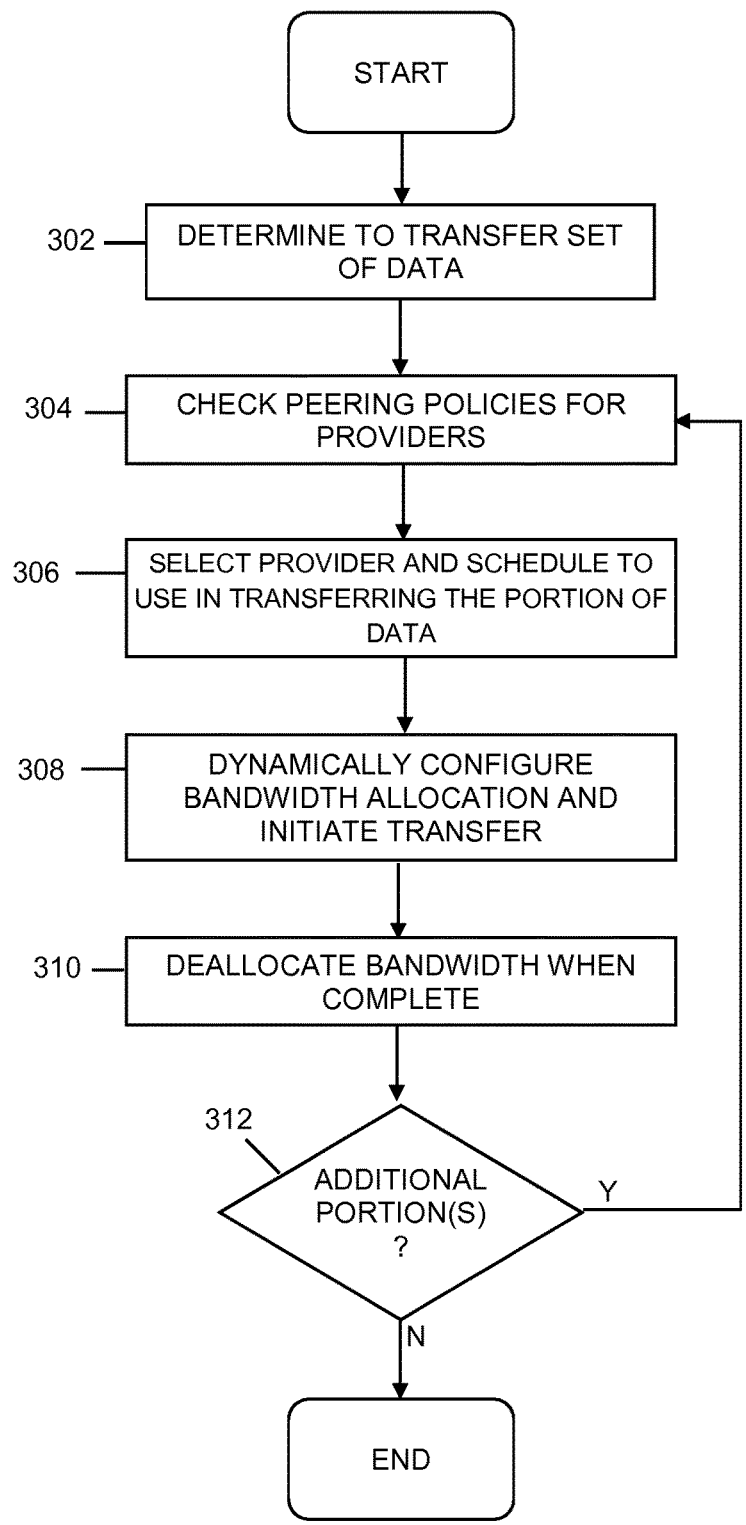
FIG. 3 depicts an example process for transferring a set of data in accordance with aspects described herein.

FIG. 3 depicts an example process for transferring a set of data in accordance with aspects described herein. In one example, the process is performed by an edge appliance, such as CPE. The process begins with the edge appliance initially determining that a set of data is to be transferred from a source storage location to a target storage location (302). In some examples, this determination is based on volume and/or rate of change of the set of data. Advantageously, aspects his process can be leveraged when a fast enough rate of change and/or large enough volume is recognized for which traditional shipment of the data on mass storage is not practical.

Then, based on the determination to transfer the set of data, the edge appliance performs 304-310 described below to dynamically establish a relationship with an elastic network service provider of a plurality of available elastic network service providers to transfer a portion of the set of data to the target storage location. Thus, the edge appliance checks a respective peering policy for each elastic network service provider of the plurality of elastic network service providers (304). The peering policy for each elastic network service provider can include at least respective bandwidth pricing information, and may more generally provide terms of the relationship between the customer and network service provider.

In one example, the checking includes accessing, for each elastic network service provider of the plurality of elastic network service providers, a respective interface exposed by the elastic network service provider to obtain the bandwidth pricing information. Providers can expose an API or other interface to enable sites to check peering policies, which has the advantage that it avoids transfer and entrance of policy information manually, while enabling a site to easily, on-demand, and quickly extract pricing and other information from the providers to facilitate establishing dynamic and on-demand relationships with the providers.

Based on the bandwidth pricing information for each of the plurality of elastic network service providers, the process continues with the edge appliance selecting an elastic network service provider to use in transferring the portion of the set of data to the target storage location and a schedule for transferring the portion of the set of data (306). This can be based on considering cost to transfer the portion of the set of data, taken across a plurality of different bandwidth levels at a plurality of different times of day. Additionally or alternatively, the selection can be based on at least one of: (i) a type of one or more applications with which the set of data is associated or (ii) time of day. In this regard, the providers can provide price and capacity information across one or more time periods and the selecting can determine a provider to use as well as a schedule (timing) to use for transferring the data based on the costs involved. Application type can also factor in, for instance some application types (critical applications, or those on which other applications depend) may be prioritized over other application types, or other characteristics of an application might dictate when it would be most appropriate to transfer application data.

After making the selection (306), the elastic network service provider is used in transferring the portion of the set of data to the target storage location. Thus, the process continues by the edge appliance or other device dynamically configuring elastic network bandwidth allocation from the selected elastic network service provider and initiating transfer of the portion of the set of data to the target storage location according to the selected schedule (308). Based on completion of the transfer of the portion of the set of data, the edge appliance or other device deallocates bandwidth from the elastic network service provider (310). The strategically selecting a provider and schedule, allocating only the necessary bandwidth at the necessary time (according to the schedule), and deallocating the bandwidth when finished has an advantage that the transfer cost can be minimized.

The set of data may include multiple portions, however the optimal transfer parameters—provider and schedule for instance—for one portion may differ from the optimal transfer parameters of another portion. It may be necessary or desired to transfer the multiple portions at different times, for example. Advantageously, the transfer is not locked into any particular parameters across portions of the data. Thus, the transfer of the portion of the set of data may be part of a staged transfer of the multiple portions of the set of data to the target storage location. The process of FIG. 3 therefore proceeds with the edge appliance determining whether additional portions of the data remain to be transferred (312). If so, the process returns to repeat 304-310, i.e. the dynamically establishing a relationship with an elastic network service provider of a plurality of available elastic network service providers, to transfer the additional portion of the set of data. The process loops to perform this for each additional portion of the multiple portions of the set of data. It is noted that there is no particular timeframe suggested between iterations. For example, it may be desired to stage the transfer across multiple consecutive weekends, where portion(s) are transferred during a first weekend and the process resumes (iterates) at some time approaching or during the next weekend to transfer the next portion(s).

For each portion of the multiple portions, the selection of the elastic network service provider to use is made independent of the selection of the elastic network service provider to use for the other portions of the multiple portions. A different dynamic relationship may be established with a first elastic network service provider for transferring the portion of data than a dynamic relationship established with a second elastic network service provider for transferring another portion of the set of data, where the first elastic network service provider is different than the second elastic network service provider. Similarly, the selected schedule to transfer a portion of the set of data may be different from the selected schedule to transfer additional portion(s) of the set of data, and schedules might overlap, potentially using different providers for different portions. As noted above, an advantage is the flexibility provided in that each portion can be transferred according to parameters that are most appropriate for that portion given the timing, bandwidth needed, type of data, etc. This enables costs and other parameters to be optimized.

Processes described herein may be performed singly or collectively by one or more computer systems, such as computer system(s) described below with reference to FIG. 4.

Figure 4:
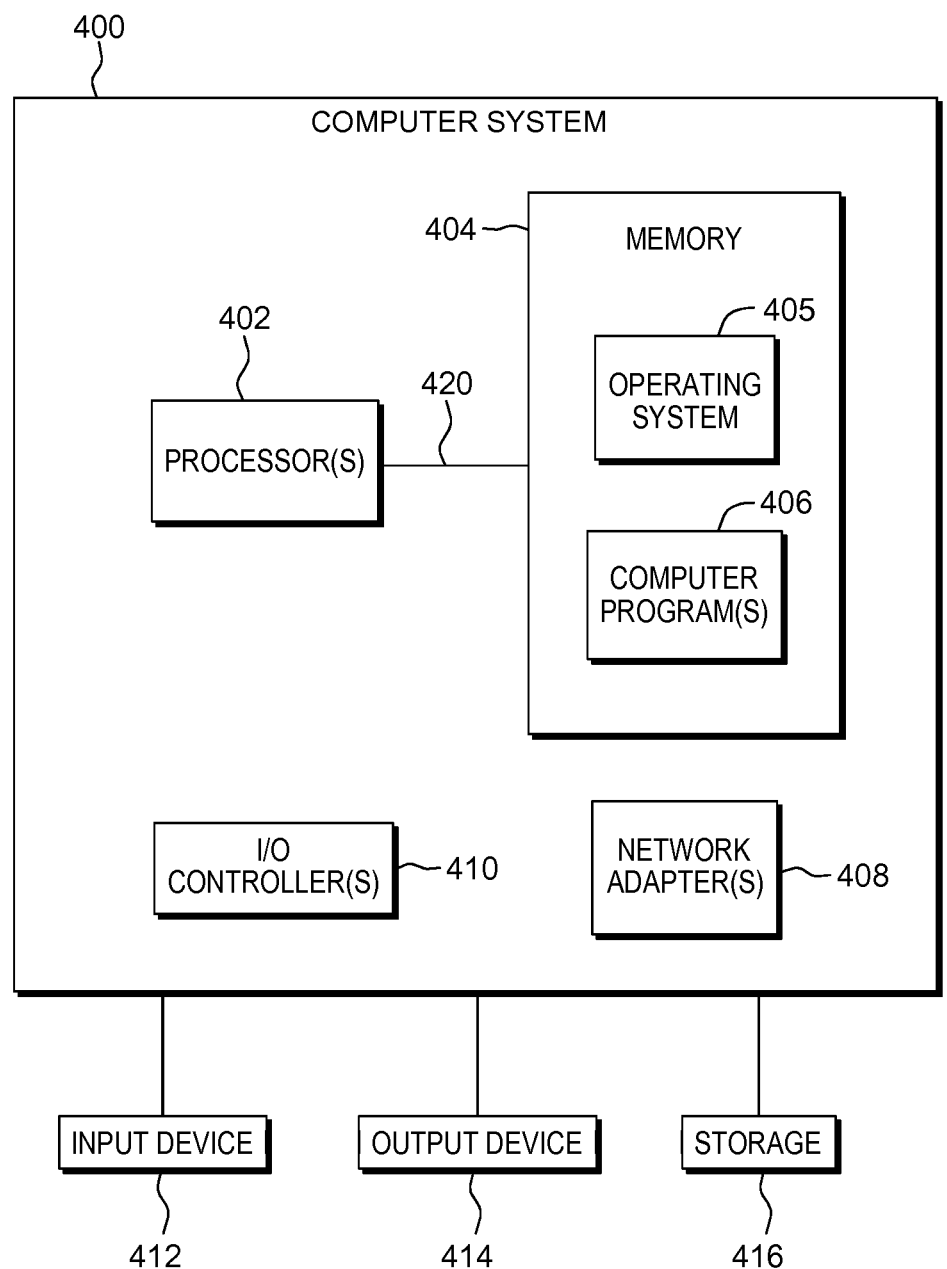
FIG. 4 depicts an example of a computer system to incorporate or use aspects described herein.

FIG. 4 depicts one example of a computer system to incorporate and use aspects described herein. A computer system may also be referred to herein as a processing device/system or computing device/system, or simply a computer. Computer system 400 may be based on one or more of various system architectures such as those offered by International Business Machines Corporation (Armonk, N.Y., USA) or Intel Corporation (Santa Clara, Calif., USA), as examples.

Computer system 400 is suitable for storing and/or executing program code and includes at least one processor 402 coupled directly or indirectly to memory 404 through, e.g., a system bus 420. In operation, processor(s) 402 obtain from memory 404 one or more instructions for execution by the processors. Memory 404 may include local memory employed during actual execution of the program code, bulk storage, and cache memories which provide temporary storage of at least some program code in order to reduce the number of times code must be retrieved from bulk storage during program code execution. A non-limiting list of examples of memory 404 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 404 includes an operating system 405 and one or more computer programs 406, for instance programs to perform aspects described herein.

Input/Output (I/O) devices 412, 414 (including but not limited to displays, microphones, speakers, accelerometers, gyroscopes, magnetometers, light sensors, proximity sensors, GPS devices, cameras, etc.) may be coupled to the system either directly or through I/O controllers 410.

Network adapters 408 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 408 used in computer system.

Computer system 400 may be coupled to storage 416 (e.g., a non-volatile storage area, such as magnetic disk drives, optical disk drives, a tape drive, etc.), having one or more databases. Storage 416 may include an internal storage device or an attached or network accessible storage. Computer programs in storage 416 may be loaded into memory 404 and executed by a processor 402 in a manner known in the art.

The computer system 400 may include fewer components than illustrated, additional components not illustrated herein, or some combination of the components illustrated and additional components. Computer system 400 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 5:
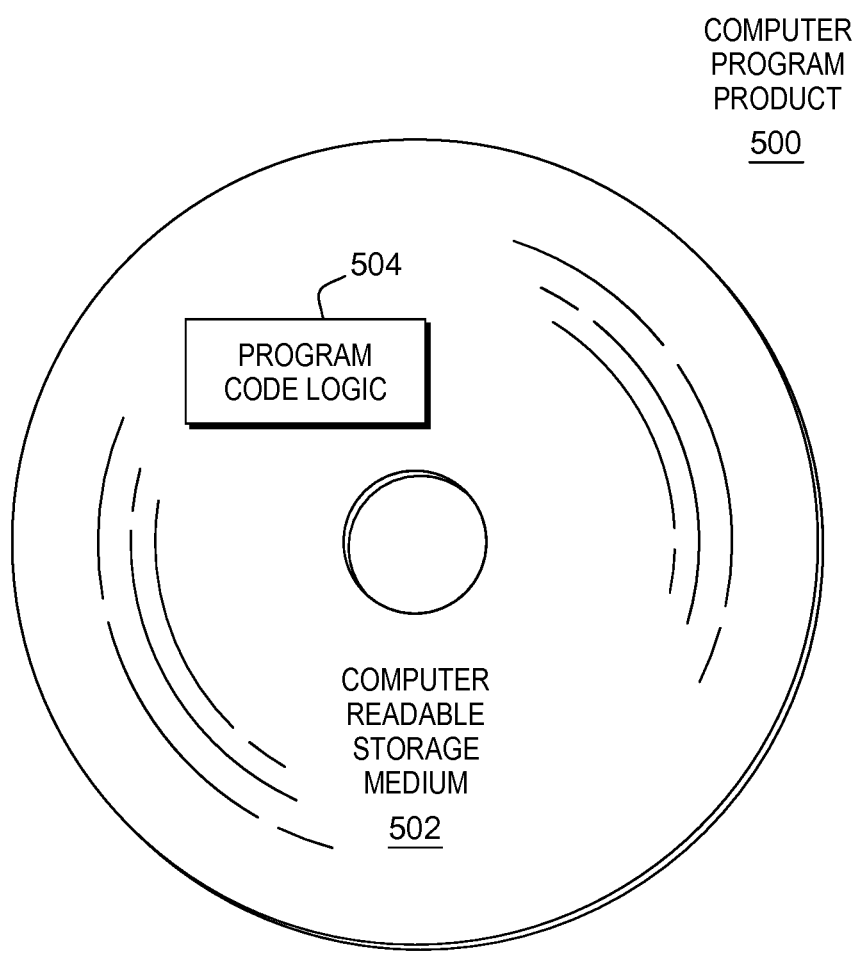
FIG. 5 depicts one embodiment of a computer program product.

Referring to FIG. 5, in one example, a computer program product 500 includes, for instance, one or more computer readable storage media 502 to store computer readable program code means, logic and/or instructions 504 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    based on a determination to transfer a set of data from a source storage location to a target storage location, dynamically establishing a relationship with an elastic network service provider of a plurality of available elastic network service providers to transfer a portion of the set of data to the target storage location, the dynamically establishing comprising:
        checking a respective peering policy for each elastic network service provider of the plurality of elastic network service providers, the peering policy for each elastic network service provider comprising respective bandwidth pricing information;
        selecting, based on the bandwidth pricing information for each of the plurality of elastic network service providers, an elastic network service provider to use in transferring the portion of the set of data to the target storage location and a schedule for transferring the portion of the set of data; and
        using the elastic network service provider in transferring the portion of the set of data to the target storage location, the using comprising dynamically configuring elastic network bandwidth allocation from the elastic network service provider and initiating transfer of the portion of the set of data to the target storage location according to the selected schedule;
    wherein the set of data comprises multiple portions, wherein the transfer of the portion of the set of data is part of a staged transfer of the multiple portions of the set of data to the target storage location, and wherein the method further comprises repeating, for each additional portion of the multiple portions of the set of data, the dynamically establishing a relationship with an elastic network service provider of a plurality of available elastic network service providers to transfer the additional portion of the set of data.

2. The method of claim 1, wherein the selecting the elastic network service provider and the schedule is based on considering cost to transfer the portion of the set of data, taken across a plurality of different bandwidth levels at a plurality of different times of day.

3. The method of claim 1, wherein for each portion of the multiple portions, the selection of the elastic network service provider to use is made independent of the selection of the elastic network service provider to use for the other portions of the multiple portions.

4. The method of claim 1, wherein a different dynamic relationship is established with a first elastic network service provider for transferring the portion of set of data than a dynamic relationship established with a second elastic network service provider for transferring an additional portion of the set of data, the first elastic network service provider being different than the second elastic network service provider.

5. The method of claim 1, wherein the selected schedule to transfer the portion of the set of data is different from the selected schedule to transfer another portion of the set of data.

6. The method of claim 1, wherein the checking comprises accessing, for each elastic network service provider of the plurality of elastic network service providers, a respective interface exposed by the elastic network service provider to obtain the bandwidth pricing information.

7. The method of claim 1, further comprising, based on completion of the transfer of the portion of the set of data, deallocating bandwidth from the elastic network service provider to minimize transfer cost.

8. The method of claim 1, wherein the selecting the elastic network service provider and the schedule is based on at least one of: (i) a type of one or more applications with which the set of data is associated or (ii) time of day.

9. The method of claim 1, further comprising initially determining that the transfer is to be performed, the determining being based on one or more of volume or rate of change of the set of data.

10. A computer program product comprising:
a computer readable storage medium readable by a processor and storing instructions for execution by the processor for performing a method comprising:
based on a determination to transfer a set of data from a source storage location to a target storage location, dynamically establishing a relationship with an elastic network service provider of a plurality of available elastic network service providers to transfer a portion of the set of data to the target storage location, the dynamically establishing comprising:
checking a respective peering policy for each elastic network service provider of the plurality of elastic network service providers, the peering policy for each elastic network service provider comprising respective bandwidth pricing information;
selecting, based on the bandwidth pricing information for each of the plurality of elastic network service providers, an elastic network service provider to use in transferring the portion of the set of data to the target storage location and a schedule for transferring the portion of the set of data; and
using the elastic network service provider in transferring the portion of the set of data to the target storage location, the using comprising dynamically configuring elastic network bandwidth allocation from the elastic network service provider and initiating transfer of the portion of the set of data to the target storage location according to the selected schedule;
wherein the set of data comprises multiple portions, wherein the transfer of the portion of the set of data is part of a staged transfer of the multiple portions of the set of data to the target storage location, and wherein the method further comprises repeating, for each additional portion of the multiple portions of the set of data, the dynamically establishing a relationship with an elastic network service provider of a plurality of available elastic network service providers to transfer the additional portion of the set of data.

11. The computer program product of claim 10, wherein the selecting the elastic network service provider and the schedule is based on considering cost to transfer the portion of the set of data, taken across a plurality of different bandwidth levels at a plurality of different times of day.

12. The computer program product of claim 10, wherein a different dynamic relationship is established with a first elastic network service provider for transferring the portion of data than a dynamic relationship established with a second elastic network service provider for transferring an additional portion of the set of data, the first elastic network service provider being different than the second elastic network service provider.

13. The computer program product of claim 10, wherein the checking comprises accessing, for each elastic network service provider of the plurality of elastic network service providers, a respective interface exposed by the elastic network service provider to obtain the bandwidth pricing information.

14. The computer program product of claim 10, wherein the selecting the elastic network service provider and the schedule is based on at least one of: (i) a type of one or more applications with which the set of data is associated or (ii) time of day.

15. The computer program product of claim 10, wherein the method further comprises initially determining that the transfer is to be performed, the determining being based on one or more of volume or rate of change of the set of data.

16. A computer system comprising:
a memory; and
a processor in communications with the memory, wherein the computer system is configured to perform a method, the method comprising:
based on a determination to transfer a set of data from a source storage location to a target storage location, dynamically establishing a relationship with an elastic network service provider of a plurality of available elastic network service providers to transfer a portion of the set of data to the target storage location, the dynamically establishing comprising:
checking a respective peering policy for each elastic network service provider of the plurality of elastic network service providers, the peering policy for each elastic network service provider comprising respective bandwidth pricing information;
selecting, based on the bandwidth pricing information for each of the plurality of elastic network service providers, an elastic network service provider to use in transferring the portion of the set of data to the target storage location and a schedule for transferring the portion of the set of data; and
using the elastic network service provider in transferring the portion of the set of data to the target storage location, the using comprising dynamically configuring elastic network bandwidth allocation from the elastic network service provider and initiating transfer of the portion of the set of data to the target storage location according to the selected schedule;
wherein the set of data comprises multiple portions, wherein the transfer of the portion of the set of data is part of a staged transfer of the multiple portions of the set of data to the target storage location, and wherein the method further comprises repeating, for each additional portion of the multiple portions of the set of data, the dynamically establishing a relationship with an elastic network service provider of a plurality of available elastic network service providers to transfer the additional portion of the set of data.

17. The computer system of claim 16, wherein a different dynamic relationship is established with a first elastic network service provider for transferring the portion of data than a dynamic relationship established with a second elastic network service provider for transferring an additional portion of the set of data, the first elastic network service provider being different than the second elastic network service provider.

18. The computer system of claim 16, wherein the method further comprises initially determining that the transfer is to be performed, the determining being based on one or more of volume or rate of change of the set of data.

19. The computer system of claim 16, wherein the selecting the elastic network service provider and the schedule is based on considering cost to transfer the portion of the set of data, taken across a plurality of different bandwidth levels at a plurality of different times of day.

20. The computer program product of claim 10, wherein for each portion of the multiple portions, the selection of the elastic network service provider to use is made independent of the selection of the elastic network service provider to use for the other portions of the multiple portions.

21. The computer system of claim 16, wherein for each portion of the multiple portions, the selection of the elastic network service provider to use is made independent of the selection of the elastic network service provider to use for the other portions of the multiple portions.

* * * * *